US012730058B2

(12) United States Patent
Maruyama

(10) Patent No.: US 12,730,058 B2
(45) Date of Patent: Sep. 8, 2026

(54) PARTICLE SORTING APPARATUS AND PARTICLE SORTING METHOD

(71) Applicant: Sony Group Corporation, Tokyo (JP)

(72) Inventor: Tsutomu Maruyama, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/578,428

(22) PCT Filed: Feb. 8, 2022

(86) PCT No.: PCT/JP2022/004854
§ 371 (c)(1),
(2) Date: Jan. 11, 2024

(87) PCT Pub. No.: WO2023/007777
PCT Pub. Date: Feb. 2, 2023

(65) Prior Publication Data

US 2024/0319069 A1 Sep. 26, 2024

(30) Foreign Application Priority Data

Jul. 26, 2021 (JP) ................................ 2021-121980

(51) Int. Cl.
*G01N 15/1492* (2024.01)
*G01N 15/1429* (2024.01)
*G01N 15/1434* (2024.01)

(52) U.S. Cl.
CPC ..... *G01N 15/1492* (2024.01); *G01N 15/1429* (2013.01); *G01N 15/1434* (2013.01)

(58) Field of Classification Search
CPC .......... G01N 15/1429; G01N 15/1434; G01N 15/1492
See application file for complete search history.

(56) References Cited

U.S. PATENT DOCUMENTS 10,346,959 B2 * 7/2019 Inoue ...................... G06T 7/514
10,627,709 B2 * 4/2020 Yoneda ............. G03B 21/2033
(Continued)

FOREIGN PATENT DOCUMENTS

JP 2009-145213 A 7/2009
JP 2014-202573 A 10/2014
(Continued)

OTHER PUBLICATIONS

International Search Report and English translation thereof mailed Apr. 19, 2022 in connection with International Application No. PCT/JP2022/004854.

(Continued)

*Primary Examiner* — Joseph C Rodriguez
(74) *Attorney, Agent, or Firm* — Wolf, Greenfield & Sacks, P.C.

(57) ABSTRACT

A technology capable of stably detecting a particle velocity with high accuracy is provided.

Provided is a particle sorting apparatus or the like including: an irradiation unit that includes a plurality of light sources and irradiates a particle contained in a fluid with light from the plurality of light sources; a detection unit that includes a plurality of pixels configured to detect, as an event, a luminance change in the light emitted from the particle due to irradiation of the light from each of the light sources; and a sorting control unit that controls sorting of the particle on the basis of event data detected by the detection unit.

12 Claims, 5 Drawing Sheets

(56) References Cited

U.S. PATENT DOCUMENTS

| | | | | |
|---|---|---|---|---|
| 10,721,395 | B2 * | 7/2020 | Kusumi | H04N 23/95 |
| 11,842,555 | B2 * | 12/2023 | Yamane | H04N 23/67 |
| 12,165,828 | B2 * | 12/2024 | Ohshima | H01J 37/073 |
| 2010/0033721 | A1 * | 2/2010 | Lee | G01N 21/55<br>356/421 |
| 2010/0297759 | A1 | 11/2010 | Kanda | |
| 2014/0299522 | A1 | 10/2014 | Ito | |
| 2018/0292304 | A1 * | 10/2018 | Otsuka | G01N 15/1436 |
| 2018/0328855 | A1 * | 11/2018 | Kido | G01N 21/8851 |
| 2022/0091015 | A1 * | 3/2022 | Otsuka | G01N 15/1425 |

FOREIGN PATENT DOCUMENTS

| | | | |
|---|---|---|---|
| JP | 2020-510222 | A | 4/2020 |
| JP | 6685057 | B1 | 4/2020 |
| WO | 2009/078307 | A1 | 6/2009 |
| WO | 2015/114750 | A1 | 8/2015 |
| WO | 2020/149042 | A1 | 7/2020 |

OTHER PUBLICATIONS

Belbachir et al., High-Speed Embedded-Object Analysis Using a Dual—Line Timed—Address-Event Temporal-Contrast Vision Sensor, IEEE Transactions on Industrial Electronics. Mar. 3, 2011;58(3):770-83.

Ridwan et al., An Event-based Optical Flow Algorithm for Dynamic Vision Sensors. International Conference Image Analysis and Recognition Jun. 2, 2017;pp. 182-189.

* cited by examiner

PARTICLE SORTING APPARATUS AND PARTICLE SORTING METHOD

CROSS-REFERENCE TO RELATED APPLICATIONS

This application claims the benefit under 35 U.S.C. § 371 as a U.S. National Stage Entry of International Application No. PCT/JP2022/004854, filed in the Japanese Patent Office as a Receiving Office on Feb. 8, 2022, which claims priority to Japanese Patent Application Number JP2021-121980, filed in the Japanese Patent Office on Jul. 26, 2021, each of which is hereby incorporated by reference in its entirety.

TECHNICAL FIELD

The present technology relates to a particle sorting apparatus and a particle sorting method. In more detail, the present technology relates to a particle sorting apparatus and a particle sorting method capable of stably detecting a particle velocity with high accuracy.

BACKGROUND ART

Currently, a technology called flow cytometry is used to examine biologically relevant particles such as cells and microorganisms, and particles such as microbeads. Flow cytometry is an examination technique in which particles in an aligned state are flowed into a fluid, and the particles are irradiated with laser light or the like to detect light released from each particle, thereby analyzing and sorting the particles.

When particles are sorted in flow cytometry, specified particles can be selectively collected by controlling sorting of the particles on the basis of detected optical information. Here, in order to efficiently control particle sorting, Patent Document 1 discloses a technology in which the time taken by a particle to move between two detection positions is counted using two light sources and two light receivers corresponding to the light sources, the time taken by the particle to reach a break-off point is worked out by finding a particle velocity, and each particle is charged at a timing according to the worked-out time.

CITATION LIST

Patent Document

Patent Document 1: Japanese Patent Application Laid-Open No. 2009-145213

SUMMARY OF THE INVENTION

Problems to be Solved by the Invention

However, in the case of finding the particle velocity using two light receivers, there has been a disadvantage that, when two detection positions change over time, an error attributable to the change may be produced in the particle velocity detection.

Thus, a main object of the present technology is to provide a technology capable of stably detecting a particle velocity with high accuracy.

Solutions to Problems

The present technology first provides a particle sorting apparatus including: an irradiation unit that includes a plurality of light sources and irradiates a particle contained in a fluid with light from the plurality of light sources; a detection unit that includes a plurality of pixels configured to detect, as an event, a luminance change in the light emitted from the particle due to irradiation of the light from each of the light sources; and a sorting control unit that controls sorting of the particle on the basis of event data detected by the detection unit.

In addition, the present technology also provides a particle sorting method including: an irradiation step of including a plurality of light sources and irradiating a particle contained in a fluid with light from the plurality of light sources; a detection step of detecting, as an event, a luminance change in the light emitted from the particle due to irradiation of the light from each of the light sources; and a sorting control step of controlling sorting of the particle on the basis of event data detected in the detection step.

MODE FOR CARRYING OUT THE INVENTION

Hereinafter, a preferred mode for carrying out the present technology will be described with reference to the drawings.

The embodiments to be described below are intended to illustrate examples of representative embodiments of the present technology, and the scope of the present technology will not be construed narrower by these embodiments. Note that the description will be given in the following order.

1. Configuration Example of Particle Sorting Apparatus 100 according to Present Technology
   - (1) Particles
   - (2) Flow Path P
   - (3) Irradiation Unit 11
   - (4) Detection Unit 12
   - (5) Sorting Control Unit 13
   - (6) Processing Unit 14
   - (7) Sorting Unit 15
   - (8) Analysis Unit 16
2. One Embodiment 2-1. Configuration Example of Particle Sorting Apparatus 100 according to Present Embodiment (1) EVS Device 122
(2) Processing Unit 14
2-2. Configuration Example of EVS Device 122
2-3. Another Configuration Example of Particle Sorting Apparatus 100 according to Present Embodiment
2-4. Specific Example of Optical System of Particle Sorting Apparatus 100 according to Present Embodiment
3. Operation Flow Examples

1. CONFIGURATION EXAMPLE OF PARTICLE SORTING APPARATUS 100 ACCORDING TO PRESENT TECHNOLOGY

Figure 1:
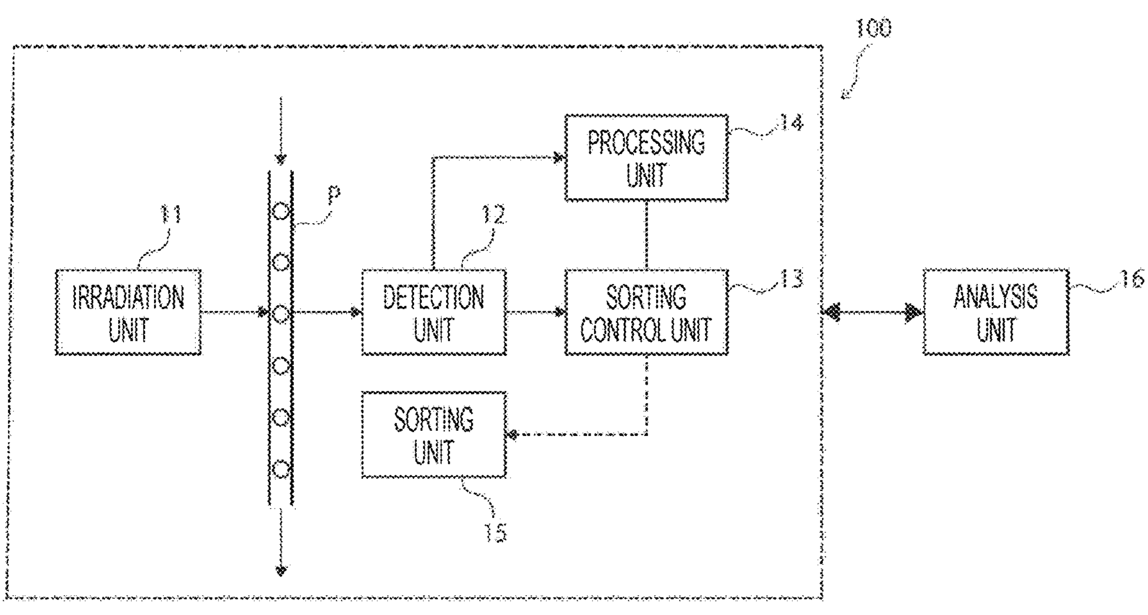
FIG. 1 is a schematic diagram illustrating a configuration example of a particle sorting apparatus according to the present technology.

FIG. 1 is a schematic diagram illustrating a configuration example of a particle sorting apparatus 100 according to the present technology. The particle sorting apparatus 100 illustrated in FIG. 1 includes at least an irradiation unit 11 that irradiates a particle flowing in a flow path P with light, a detection unit 12 that detects light produced by the irradiation, and a sorting control unit 13 that controls sorting of the particle on the basis of information detected by the detection unit 12. In addition, the particle sorting apparatus 100 may include a processing unit 14, a sorting unit 15, an analysis unit 16, and the like, as necessary.

(1) Particles

In the present technology, "particles" can broadly include biologically relevant particles such as cells, microorganisms, and ribosomes, or synthetic particles such as latex particles, gel particles, and industrial particles, or the like. In addition, in the present technology, the particles are contained in a fluid such as a liquid sample.

The biologically relevant particles can include chromosomes composing various cells, ribosomes, mitochondria, organelles (cell organelles), and the like. The cells can include animal cells (such as blood cells as an example) and plant cells. The microorganisms can include bacteria such as *Escherichia coli*, viruses such as tobacco mosaic virus, fungi such as yeast, and the like. In addition, the biologically relevant particles can also include biologically relevant polymers such as nucleic acids, proteins, and composites of these, for example.

For example, the industrial particles may be an organic or inorganic polymer material, metal, or the like. The organic polymer material can include polystyrene, styrene/divinylbenzene, polymethyl methacrylate, and the like. The inorganic polymer material can include glass, silica, magnetic material, and the like. The metal can include gold colloid, aluminum, and the like. In general, shapes of these particles are normally spherical, but may be non-spherical in the present technology, while the dimensions, mass, and the like thereof are also not particularly limited.

In the present technology, the biologically relevant particles are particularly preferable as the particles.

In the present technology, the particles may be labeled with one or two or more kinds of dyes such as fluorescent dyes. In these circumstances, for example, the available fluorescent dyes include Cascade Blue, Pacific Blue, fluorescein isothiocyanate (FITC), phycoerythrin (PE), propidium iodide (PI), Texas Red (TR), peridinin chlorophyll protein (PerCP), allophycocyanin (APC), 4', 6-diamidino-2-phenylindole (DAPI), Cy3, Cy5, Cy7, Brilliant Violet (BV421), and the like.

(2) Flow Path P

The flow path P can be configured such that a flow in which particles are placed in a substantially line is formed. The flow path P may be provided in advance in the particle sorting apparatus 100, but it is also possible to install a commercially available flow path, a disposable chip provided with a flow path, or the like.

The form of the flow path P is also not particularly limited and can be freely designed as appropriate. For example, without restricting to the flow path formed in a substrate T of two-dimensional or three-dimensional plastic, glass, or the like, a flow path as used in a conventional flow cytometer can also be used.

The particle sorting apparatus 100 according to the present technology can be configured such that particles contained in a fluid flowing inside the flow path P are irradiated with light from the irradiation unit 11. In addition, the light irradiation point (interrogation point) may be configured such that the irradiation point (interrogation point) is located inside a flow path structure in which the flow path P is formed.

Specifically, for example, a configuration in which the flow path P inside a chip or a flow cell is irradiated with light can be mentioned.

A flow path width, a flow path depth, a flow path cross-sectional shape, and the like of the flow path P are not particularly limited, as long as a laminar flow can be formed, and can be freely designed as appropriate. For example, a micro flow path having a flow path width of 1 mm or less can also be used in the particle sorting apparatus 100.

Figure 2:
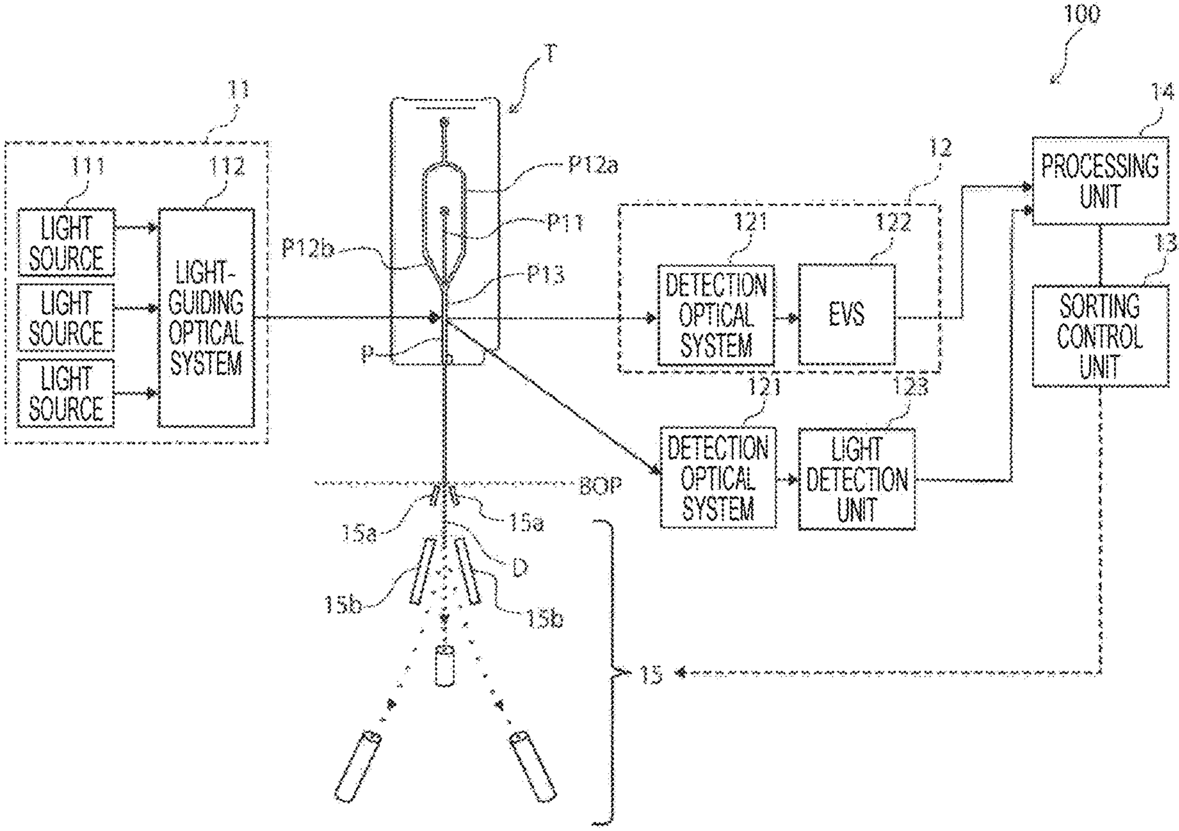
FIG. 2 is a block diagram illustrating a more specific configuration example of the particle sorting apparatus according to an embodiment of the present technology.

A method of pouring particles into the flow is not particularly limited, and the particles can be caused to flow through the flow path P according to the form or the like of the flow path P. Specifically, for example, in the case of the flow path P (chip approach) formed in the substrate T as illustrated in FIG. 2, a sample liquid containing particles is introduced into a sample liquid flow path P11, and a sheath liquid is introduced into two sheath liquid flow paths P12*a* and P12*b*, separately. Then, the sample liquid flow path P11 and the two sheath liquid flow paths P12*a* and P12*b* merge into a main flow path P13.

A sample liquid laminar flow fed to inside the sample liquid flow path P11 and sheath liquid laminar flows fed to inside the two sheath liquid flow paths P12*a* and P12*b* merge inside the main flow path P13, whereby a sheath flow in which the sample liquid laminar flow is sandwiched between the sheath liquid laminar flows can be formed. In these circumstances, vibration is imparted to a part of a surface of the substrate T by a vibration element, and a droplet can be formed out of a liquid column projected from an orifice.

Inside the flow path P, the laminar flows in which the sheath liquid and the sample liquid containing particles flow do not mix with each other and flow in parallel. In a case where a liquid feeding pressure of the sample liquid is not so high with respect to a liquid feeding pressure of the sheath liquid, the laminar flow of the sample liquid flows substantially at the center of the flow path P and has a narrower width with respect to the laminar flow of the sheath liquid. Therefore, the particles flow inside the flow path P at a constant speed. However, when the liquid feeding pressure of the sample liquid is increased in order to increase an event rate at which the particles are detected, the width of the laminar flow of the sample liquid is widened, and the respective particles are caused to flow at different speeds depending on the distance from the center.

In particular, the present technology can be suitably used in a case where the respective particles flow at different speeds inside the flow path P as described above.

(3) Irradiation Unit 11

The irradiation unit 11 includes a plurality of light sources and irradiates particles contained in a fluid with light from the plurality of light sources. The plurality of light sources may discharge light with the same wavelength as each other or may discharge light with different wavelengths from each other.

The type of light for irradiation from the irradiation unit 11 is not particularly limited, but in order to reliably cause light to arise from the particles, light having a constant light direction, wavelength, and light intensity is desirable. Specifically, for example, laser light, a light emitting diode (LED), and the like can be mentioned.

Examples of the laser light include a semiconductor laser, an argon ion (Ar) laser, a helium-neon (He—Ne) laser, a dye laser, a krypton (Cr) laser, a solid-state laser in which a semiconductor laser and a wavelength conversion optical element are combined, and the like, and two or more kinds of these lasers can also be used in combination.

The irradiation unit 11 can be configured such that the light discharged from the plurality of light sources is multiplexed and then, the particles are irradiated with the multiplexed light. In the present technology, the irradiation unit 11 is preferably configured to perform irradiation with light from the plurality of light sources at different positions in a flow direction of the fluid. In these circumstances, the position irradiated with light may be configured such that at least two or more (such as two, three, four, five, six, or seven as an example) spots are irradiated, and the particle sorting apparatus 100 can be configured such that the particle passes through these spots.

In order to configure the irradiation unit 11 in such a manner, the irradiation unit 11 can include a light-guiding optical system for guiding this plurality of light rays to predetermined positions. The light-guiding optical system may include, for example, optical constituents such as a beam splitter group, a mirror group, and an optical fiber in order to multiplex the plurality of light rays. In addition, the light-guiding optical system may include a lens group for condensing the multiplexed excitation light and can include, for example, an objective lens.

Note that, in FIG. 1, the particles being flowing through the flow path P are irradiated with light (cuvette detection approach), but in the case of ejecting the fluid as a jet flow from the orifice of the flow path P, the liquid column portion of the jet flow may be irradiated with light (jet in air detection approach).

(4) Detection Unit 12

In the present technology, a plurality of pixels that detects, as an event, a change in luminance (also referred to as "light intensity") of light emitted from a particle due to irradiation of each of the light rays is provided as a sensor (detection unit) for acquiring information regarding the particle. Specifically, it is possible to use an event-based vision sensor (EVS) that asynchronously outputs the coordinates (position information) of the pixel that has detected a luminance change, time information at which the luminance change was detected, and a direction (polarity information) of the luminance change, as event data. By using the EVS as the detection unit 12, the particle velocity can be stably detected with high accuracy, of which details will be described later.

Note that the information regarding the particle may include, for example, particle image data (particle image) reconstructed from the event data, a particle feature such as a shape, dimensions, or a color extracted from the event data or the particle image data, information generated from the event data, the particle image data, the particle feature, or the like, and attribute information indicating normality or anomaly, or the like.

The present technology can include a light detection unit that detects light (also referred to as "measurement target light") emitted from a particle due to irradiation of the particle with light by the irradiation unit 11. In these circumstances, examples of the light to be detected include fluorescence, scattered light (for example, any one or more of forward scattered light, backward scattered light, or side scattered light), transmitted light, reflected light, and the like. The light detection unit is constituted by at least one or more photodetectors, and the photodetector includes one or more light-receiving elements and, for example, includes a light-receiving element array. The photodetector may include one or a plurality of photodiodes such as a photomultiplier tube (PMT) and/or an avalanche photodiode (APD) and a multi-pixel photon counter (MPPC), as the light-receiving elements. The photodetector can include, for example, a PMT array in which a plurality of PMTs is arranged in a one-dimensional direction. In addition, the photodetector may include an imaging element such as a charge-coupled device (CCD) or a complementary metal-oxide-semiconductor (CMOS). The measurement target light is converted into an electrical signal by the photodetector, and the electrical signal is output to the processing unit 14 to be described later and utilized to acquire the information regarding the particle.

The light detection unit can include a signal processing unit that converts the electrical signal obtained by the photodetector into a digital signal. In addition, the signal processing unit may include an analog-to-digital (A/D) converter as an apparatus that performs the conversion. The digital signal obtained by the conversion by the signal processing unit can be sent to the processing unit 14 to be described later. The digital signal can be treated as data relating to light (also referred to as "light data") by the processing unit 14. Examples of the light data include light data including fluorescence data, and the like. More specifically, the light data may be light intensity data, and the light intensity may be light intensity data of light including fluorescence (such as features including the area, height, and width, as an example).

Furthermore, along with the light detection unit, the present technology can include a detection optical system that causes light having a predetermined detection wavelength to reach the EVS or the corresponding photodetector described above. The detection optical system can include a spectroscopic unit such as a prism or a diffraction grating, or a wavelength separation unit such as a dichroic mirror or an optical filter. For example, the detection optical system may be configured to disperse light from the particle and detect light in different wavelength bands in a plurality of photodetectors, of which the number is larger than the number of fluorescent dyes. In addition, the detection optical system may be configured to separate the light corresponding to the fluorescence wavelength band of a fluorescent dye from the light from the particle, for example, and cause the EVS or the corresponding photodetector described above to detect the separated light.

(5) Sorting Control Unit 13

The sorting control unit 13 controls sorting of the particles on the basis of information detected by the detection unit 12 and the light detection unit. Specifically, the charging timing for a droplet D containing a specified particle to be sorted is controlled on the basis of the event data detected using the EVS, of which details will be described later. In addition, determination as to whether or not to sort each particle is executed on the basis of a sorting control signal based on the information regarding the particle acquired by the light detection unit, and the like. Then, the sorting control unit 13 controls the sorting unit 15 to be described later on the basis of the result of the determination, whereby the particles are sorted.

(6) Processing Unit 14

The processing unit 14 designates the particle velocity on the basis of the event data. For example, the calculation can be performed on the basis of the event data output every time each particle passes through each light source, and the particle velocity of each particle can be acquired, of which details will be described later. In addition, the processing unit 14 performs sorting verification on the basis of the information regarding the particle (such as the features of the particle including the dimensions, form, and internal structure of the particle, and the attribute information on the particle, as an example) acquired by the light detection unit, light data, sorting conditions given by an input unit to be described later, and the like and generates the sorting control signal. On the basis of the sorting control signal, the sorting control unit 13 described above controls the sorting unit 15 to be described later so as to execute determination as to whether or not to sort each particle. Here, the sorting control signal may include information regarding the presence or absence of charging by a charging unit and the magnitude of the charge.

(7) Sorting Unit 15

The sorting unit 15 includes a charging unit that charges the droplet D containing the particles and sorts the droplet D containing a specified particle to be sorted. Specifically, for example, the droplet D containing particles is generated by vibration formed by a vibration element such as a piezoelectric element, the droplet D to be sorted is charged by the charging unit according to an instruction from the sorting control unit 13 described above, and a traveling direction of the droplet D is controlled by a counter electrode. In the present technology, the traveling direction of the particles may be controlled within the flow path structure to sort particles. In these circumstances, the flow path structure may be provided with, for example, a control mechanism by pressure (injection or suction) or a charge, and examples of the flow path structure include a chip as illustrated in FIG. 2, and the like.

(8) Analysis Unit 16

The analysis unit 16 performs information processing for executing processing of various kinds of data (such as the information regarding the particle, a feature based on a result of examination, statistical data, and a class discrimination result, as an example) and stores the various kinds of data. As the information processing, for example, in a case where the light data corresponding to a fluorescent dye is acquired from the light detection unit, fluorescence leakage correction (compensation process) is performed on the light intensity data. In addition, a fluorescence separation process is executed on the light data, and the light intensity data corresponding to the fluorescent dye is acquired.

The fluorescence separation process may be performed in accordance with an unmixing method disclosed in JP 2011-232259 A, for example. In addition, in a case where the light detection unit includes an imaging element, particle form information may be acquired on the basis of the image acquired by the imaging element. In these circumstances, the analysis unit 16 may be configured such that the acquired light data can be held. The analysis unit 16 may be configured such that spectral reference data to be used in the unmixing process can be further held.

In addition, the analysis unit 16 may be configured such that various kinds of data can be output.

Specifically, for example, the light data, image data, and various kinds of data (such as two-dimensional plots and spectral plots, as an example) generated on the basis of the light data can be output. Furthermore, the analysis unit 16 may be configured such that input of the various kinds of data can be accepted and accepts, for example, a gating process on a plot by a user. The analysis unit 16 can include an output unit (such as a display, a portable information terminal, or a printer, as an example) or an input unit (such as a mouse, a keyboard, or a portable information terminal, as an example) for causing the output or the input to be executed. In addition, the analysis unit 16 can include a display unit that presents various kinds of data such as the information regarding the particle, a feature based on a result of examination, statistical data, and a class discrimination result.

The analysis unit 16 may be configured as a general-purpose computer and may be configured as an information processing apparatus including, for example, a central processing unit (CPU), a random access memory (RAM), and a read only memory (ROM). The analysis unit 16 may be included in a housing provided with the irradiation unit 11, the detection unit 12, and the like, or may be located outside the housing. Note that, in the present technology, the analysis unit 16 is not indispensable, and the above-described various processes or functions by the analysis unit 16 may be implemented by a server computer or a cloud connected via a network.

2. ONE EMBODIMENT

Next, an embodiment according to the present technology will be described in detail with reference to the drawings.

2-1. CONFIGURATION EXAMPLE OF PARTICLE SORTING APPARATUS 100 ACCORDING TO PRESENT EMBODIMENT

FIG. 2 is a block diagram illustrating a more specific configuration example of the particle sorting apparatus 100 according to an embodiment of the present technology. As illustrated in FIG. 2, the particle sorting apparatus 100 according to the present embodiment includes light sources 111 and a light-guiding optical system 112 constituting the irradiation unit 11, a detection optical system 121, an EVS device 122, and a light detection unit 123 constituting the detection unit 12, the sorting control unit 13, the processing unit 14, and charging units **15*a* and counter electrodes 15*b* constituting the sorting unit 15 and observes an image of light emitted from a particle contained in a fluid flowing in the flow path P. Note that the light sources 111, the light-guiding optical system 112, the detection optical system 121, the light detection unit 123, the sorting control unit 13, the processing unit 14, and the sorting unit 15 may be partially or entirely similar to those described above with reference to FIG. 1. Note that, in FIG. 2, the analysis unit 16** is omitted.

More specifically, light (excitation light) output from the light sources 111 is condensed by the light-guiding optical system 112. The condensed light serves to irradiate the particles flowing at a high speed inside the flow path P in which a fluid (such as a biological sample as an example) with particles in a floating state flows. The light emitted from a particle irradiated with light is formed as an image on a light-receiving surface of the EVS device 122 through the detection optical system 121 or detected by the light detection unit 123. Examples of the light emitted from the particle include fluorescence, scattered light (for example, any one or more of forward scattered light, backward scattered light, or side scattered light), transmitted light, and reflected light. In the present embodiment, the light detected by the EVS device 122 is particularly preferably fluorescence or scattered light. In addition, since scattered light is produced at any excitation wavelength, scattered light is more preferable, and among the kinds of scattered light, forward scattered light having high light intensity is particularly preferable.

(1) EVS Device 122

The EVS device 122 includes, for example, pixels (hereinafter, referred to as "event pixels") arranged in a two-dimensional lattice pattern, of which details will be described later. Each event pixel detects an event on the basis of a luminance change in incident light.

Figure 3:
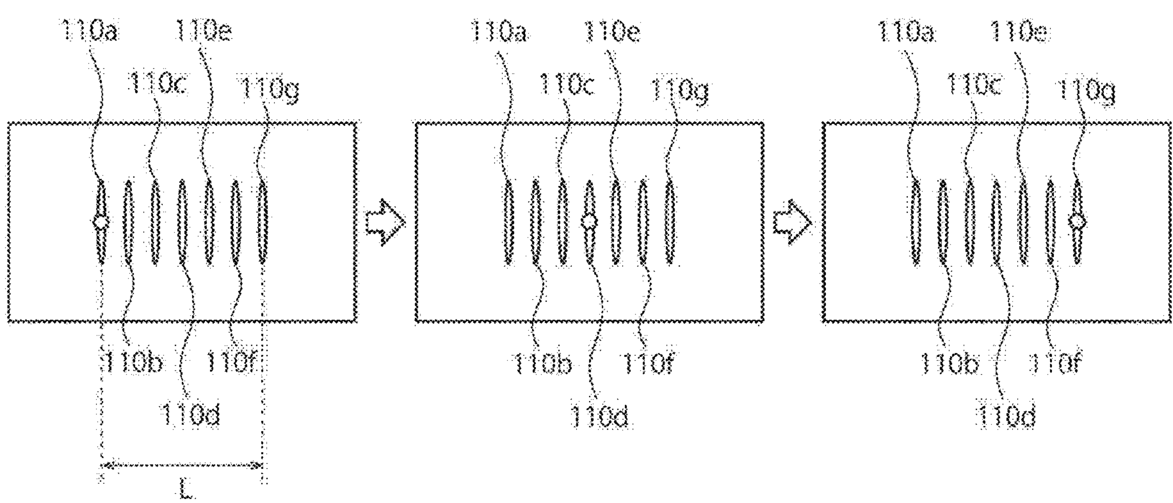
FIG. 3 is a diagram illustrating an example of output images of an event-based vision sensor (EVS).

FIG. 3 is an image (an example of output images of the EVS) when particles pass on the light-receiving surface of the EVS device 122. In FIG. 3, the particles pass from the left to right, and light is radiated at a light-condensing position of each light source. Therefore, a luminance change is caused. The EVS device 122 detects that luminance change asynchronously (preferably asynchronously) and outputs the detected luminance change as event data including position information (X address and Y address) on the pixel that detected the event, polarity information (positive event or negative event) on the detected event, time information (time stamp) at which the event was detected, and the like.

Since the event data described above is output every time a particle passes through each light source, in the present embodiment, the sorting control unit 13 can acquire each particle velocity by performing calculation according to the position information on the pixel that detected the event and the time information at which the event was detected.

Specifically, the sorting control unit 13 specifies a light interval between the plurality of light sources 111 on the basis of the position information obtained every time a particle passes through specified spots 110 (see also spots 110*a* to 110*g* in FIG. 3) based on the light sources 111. In addition, using the time information obtained every time a particle passes through the specified spots 110 based on the light sources 111, the particle velocity=light interval/particle passing time is found, and a droplet charging time (delay time) of each particle is computed according to the found particle velocity and a liquid feeding distance. Then, the sorting control unit 13 controls the charging unit 15*a* in the sorting unit 15 on the basis of this delay time and applies a charge to the droplet D containing a specified particle to be sorted at an optimum timing.

Here, in Patent Document 1 described above, a moving speed of the particle is found on the basis of two detection positions (=excitation light spot interval) irradiated by a plurality of light sources, and the charging timing for the droplet containing the particle is controlled on the basis of the found moving speed. However, in the method described in Patent Document 1, it is not considered that the excitation light spot interval is affected by heat or the like arising from the irradiation unit or the whole particle sorting apparatus and changes over time. Therefore, when the excitation light spot interval changes, this leads to a detection error for the particle velocity, and the optimum charging timing is not allowed to be computed. As a result, the sorting performance such as the yield, the recovery rate, and the purity will deteriorate.

In addition, in order to sort the particles at a high speed by increasing the event rate, a core flow (sample flow) becomes larger, and thus the speed difference between respective particles becomes larger. Moreover, a driving frequency of the vibration element that generates the droplets becomes higher, and the required time accuracy to the break-off point at which the droplets are charged becomes severe.

In contrast to this, in the present embodiment, since the delay time can be specified using the EVS device 122, a change in the light interval over time can be handled, and the particle velocity can be stably detected with high accuracy. As a result, since a speed compensation system that optimizes the timing of charging according to individual particles can be constructed, the particle sorting apparatus 100 with improved sorting performance such as yield, recovery rate, and purity can be implemented.

In addition, in the present embodiment, on the basis of the fact that the light-condensing position of each light source 111 does not greatly fluctuate, the position information on the pixel that detected the event is gated in advance, and the luminance change at the detection position of the pixel is calculated, whereby the calculation speed and the detection accuracy can be further enhanced.

Furthermore, in the present embodiment, in a case where the plurality of light sources 111 is made up of three or more light sources 111, the event is preferably detected by irradiation of light based on two light sources 111 farthest from each other in the flow direction of the fluid, from the viewpoint of time resolution of the EVS device 122. Specifically, for example, in the example of the output images of the EVS illustrated in FIG. 3, the particles are irradiated with light from the seven light sources 111, and it is preferable to specify the interval of the light on the basis of the position information obtained every time a particle passes through the spots based on the two light sources 111 farthest from each other with respect to the flow direction of the fluid, that is, the spot 110*a* and the spot 110*g*, among the spots 110*a* to 110*g* based on the seven light sources 111. This enables to detect the particle velocity with higher accuracy.

In addition, in a case where the plurality of light sources 111 is made up of three or more light sources 111, it is preferable that each of the light sources 111 is positioned at intervals to such an extent that the light sources 111 do not mutually interfere with each other. Furthermore, a detection position interval (see L of FIG. 3) between the two light sources 111 farthest from each other in the flow direction of the fluid is preferably 100 μm or more, more preferably 250 μm or more, and still more preferably 400 μm or more in the flow cell. In addition, in a case where scattered light is detected as light radiated from particles in the EVS device 122, the shorter the excitation wavelength, the easier it is to detect scattered light from a particle having a small size. Therefore, for example, the light source 111 having the shortest excitation wavelength that can be detected by the EVS device 122 and the light source 111 having the second shortest excitation wavelength that can be detected by the EVS device 122 can be positioned at the farthest positions in the flow direction of the fluid.

A string of the event data (also referred to as an "event stream") arising from each pixel in correspondence with the image of the particle moving on the light-receiving surface of the EVS device 122 is convey to the processing unit 14.

(2) Processing Unit 14

The processing unit 14 reconstructs frame data of the image of the particle from the event stream and the particle velocity input from the EVS device 122 and examines the reconstructed frame data.

In addition, the processing unit 14 performs sorting verification on the basis of the information regarding the particle and the light data acquired by the light detection unit 123, the input sorting conditions, and the like and generates the sorting control signal. On the basis of the generated sorting control signal, the sorting control unit 13 controls the sorting unit 15 to execute determination as to whether or not to sort each particle. Here, the sorting control signal may include information regarding the presence or absence of charging by the charging unit and the magnitude of the charge.

2-2. CONFIGURATION EXAMPLE OF EVS DEVICE 122

Next, a configuration example of the EVS device 122 will be described in detail with reference to the drawings.

Figure 4:
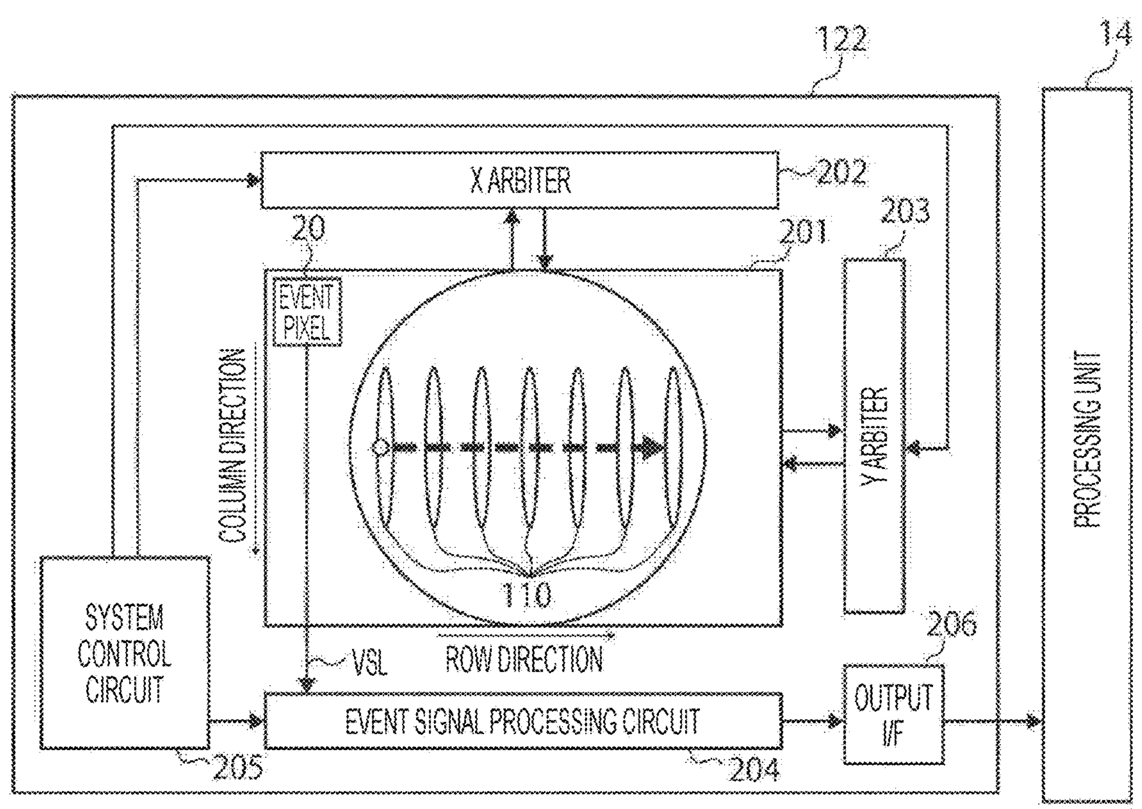
FIG. 4 is a block diagram illustrating a configuration example of an EVS device according to the embodiment of the present technology.

FIG. 4 is a block diagram illustrating a configuration example of the EVS device 122 according to the present embodiment. As illustrated in FIG. 4, the EVS device 122 includes a pixel array unit 201, an X arbiter 202 and a Y arbiter 203, an event signal processing circuit 204, a system control circuit 205, and an output interface (I/F) 206.

The pixel array unit 201 has a configuration in which a plurality of event pixels 20 that each detect an event on the basis of a luminance change in the incident light is arranged in a two-dimensional lattice pattern. Note that, in the following description, a row direction refers to an arrangement direction of pixels in a pixel row (the lateral direction in the drawing), and a column direction refers to an arrangement direction of pixels in a pixel column (the longitudinal direction in the drawing).

Each event pixel 20 includes a photoelectric conversion element that generates a charge according to the luminance of the incident light and, in a case where a luminance change in the incident light has been detected on the basis of a photocurrent flowing out from the photoelectric conversion element, outputs a request for demanding reading from the own event pixel 20, to the X arbiter 202 and the Y arbiter 203, and outputs an event signal indicating that an event has been detected, in accordance with arbitration by the X arbiter 202 and the Y arbiter 203.

Each event pixel 20 detects the presence or absence of an event, depending on whether or not a change exceeding a predetermined threshold value has been produced in the photocurrent according to the luminance of the incident light. For example, each event pixel 20 detects, as an event, that the luminance change has exceeded the predetermined threshold value (positive event) or has fallen below the predetermined threshold value (negative event).

When detecting an event, the event pixel 20 outputs a request for demanding permission to output an event signal representing the occurrence of the event, to each of the X arbiter 202 and the Y arbiter 203. Then, the event pixel 20 outputs the event signal to the event signal processing circuit 204 in a case where a response representing permission to output the event signal is given by each of the X arbiter 202 and the Y arbiter 203.

The X arbiter 202 and the Y arbiter 203 arbitrate a request for demanding output of the event signal supplied from each of the plurality of event pixels 20 and send a response based on a result of the arbitration (permission or non-permission of the output of the event signal) and a reset signal for resetting the event detection, to the event pixel 20 that has output the request.

The event signal processing circuit 204 generates and outputs the event data by executing predetermined signal processing on the event signal input from the event pixel 20.

As described above, the change in the photocurrent generated in the event pixel 20 can also be regarded as a light amount change (luminance change) of the light incident on a photoelectric conversion unit of the event pixel 20. Accordingly, it can be said that the event is a light amount change (luminance change) in the event pixel 20 exceeding the predetermined threshold value. The event data representing the occurrence of an event includes at least the position information such as coordinates representing the position of the event pixel 20 where the light amount change as an event has occurred. The event data can include the polarity of light amount change along with the position information.

For the series of pieces of the event data output from the event pixels 20 at a timing when an event occurred, as long as an interval between pieces of the event data is maintained as it was when the events occurred, the event data implicitly includes time information representing a relative time at which the event occurred.

However, when the interval between pieces of the event data is not maintained as it was when the events occurred because, for example, the event data is stored in a storage unit, the time information implicitly included in the event data is lost. Therefore, before the interval between pieces of the event data is no longer maintained as it was when the events occurred, the event signal processing circuit 204 may include time information representing a relative time at which the event occurred, such as a time stamp, in the event data.

As another configuration, the system control circuit 205 is constituted by a timing generator or the like that generates various timing signals and performs drive control of the X arbiter 202, the Y arbiter 203, the event signal processing circuit 204, and the like on the basis of various timings generated by the timing generator.

In addition, the output I/F 206 outputs the event data output in units of rows from the event signal processing circuit 204 to the processing unit 14 as an event stream at any time, that is, asynchronously.

2-3. ANOTHER CONFIGURATION EXAMPLE OF PARTICLE SORTING APPARATUS 100 ACCORDING TO PRESENT EMBODIMENT

Figure 5:
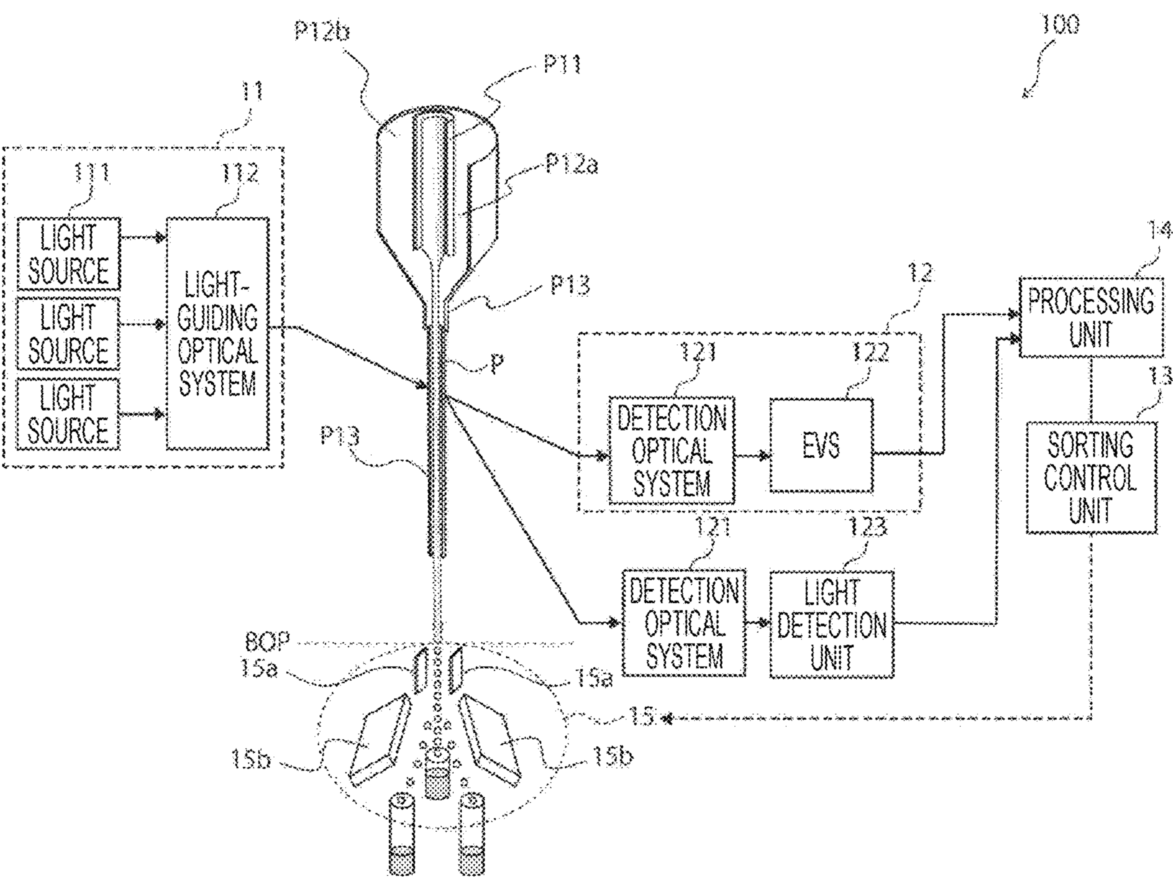
FIG. 5 is a block diagram illustrating another more specific configuration example of the particle sorting apparatus according to the embodiment of the present technology.

FIG. 5 is a block diagram illustrating another more specific configuration example of the particle sorting apparatus 100 according to the embodiment of the present technology. As illustrated in FIG. 5, the particle sorting apparatus 100 according to the present embodiment includes light sources 111 and a light-guiding optical system 112 constituting the irradiation unit 11, a detection optical system 121, an EVS device 122, and a light detection unit 123 constituting the detection unit 12, the sorting control unit 13, the processing unit 14, and charging units **15*a* and counter electrodes 15*b* constituting the sorting unit 15 and observes an image of light emitted from a particle contained in a fluid flowing in the flow path P. Note that the light sources 111, the light-guiding optical system 112, the detection optical system 121, the EVS device 122, the light detection unit 123, the sorting control unit 13, the processing unit 14, and the sorting unit 15 may be partially or entirely similar to those described above with reference to FIGS. 1 and 2. Note that, in FIG. 5, the analysis unit 16** is omitted.

The particle sorting apparatus 100 according to the present embodiment is different from the particle sorting apparatus 100 illustrated in FIG. 2 in the configuration of the flow path P. As described above, in the present technology, the flow path P is not restricted to the flow path formed in the substrate T of two-dimensional or three-dimensional plastic, glass, or the like illustrated in FIG. 2, and a flow path as used in a conventional flow cytometer as illustrated in FIG. 5 can also be used.

In the case of the flow cell approach as illustrated in FIG. 5, the sheath liquid and the sample liquid are inserted into a conical container. The conical container is installed with its apex facing vertically downward, and a tube or the like for introducing the sheath liquid is connected to an upper side surface. An upper surface of the conical container is open, and a vibration element is attached in a sealed state with an O-ring. The sample liquid is inserted vertically from above the container. The conical container narrows at the lowermost portion, and its tip is coupled to a cuvette portion with a linear flow path P13 formed inside. When a laminar flow is formed such that the sheath liquid surrounds the sample liquid in the conical container and the sample liquid travels to the cuvette portion as a laminar flow as it is, detection by light irradiation is performed in the linear flow path P13. A detachable outlet nozzle is installed at the endpoint of the linear flow path P13, and a connection portion has a sloped shape so as to be continuously narrowed from a cuvette outlet to the outlet nozzle.

2-4. SPECIFIC EXAMPLE OF OPTICAL SYSTEM OF PARTICLE SORTING APPARATUS 100 ACCORDING TO PRESENT EMBODIMENT

Figure 8:
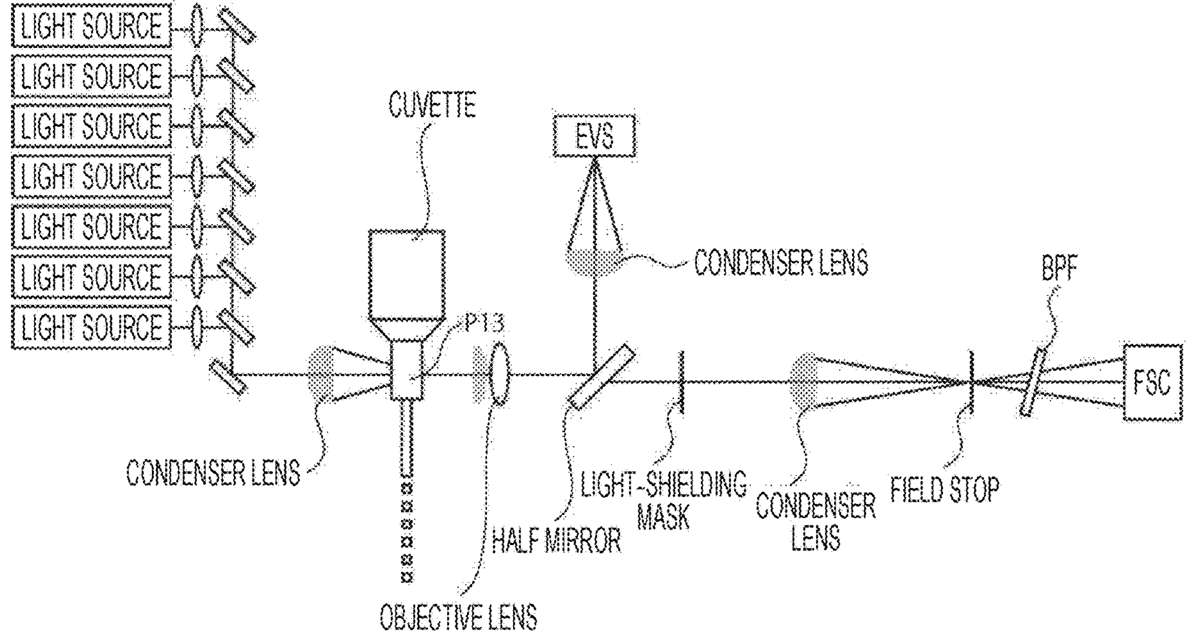
FIG. 8 is a schematic diagram illustrating a specific example of an optical system of the particle sorting apparatus according to the embodiment of the present technology.

FIG. 8 is a schematic diagram illustrating a specific example of an optical system of the particle sorting apparatus 100 according to the embodiment of the present technology. FIG. 8 illustrates a configuration example of a part of the light sources 111 and the light-guiding optical system 112 constituting the irradiation unit 11, and the detection optical system 121, the EVS device 122, and the light detection unit 123 constituting the detection unit 12 in the particle sorting apparatus 100 according to the present embodiment. The sorting control unit 13, the processing unit 14, the sorting unit 15, and the analysis unit 16 (not illustrated) may be partially or entirely similar to those described above with reference to FIGS. 1, 2, and 5. Note that, in FIG. 8, photodetectors of the light detection unit 123 other than a forward scattered light detector are omitted.

The particle sorting apparatus 100 according to the present embodiment includes seven light sources, and these light sources project light having wavelengths different from each other. The light projected from each light source is condensed at different positions in the linear flow path P13 within the cuvette via the light-guiding optical system 112 such as a lens, a beam splitter, or a mirror. Then, the particles flowing in the linear flow path P13 are irradiated with light to produce fluorescence and forward scattered light. The forward scattered light is incident on an objective lens, the forward scattered light condensed by the objective lens is separated by a half mirror, and one ray of the separated light is condensed by a condenser lens and formed as an image at different positions on the light-receiving surface of the EVS device. In addition, the other ray of the separated light is condensed by a condenser lens after the excitation light is removed by a light-shielding mask, a disturbance component is removed by a field stop (pinhole), an unnecessary light component is removed by a bandpass filter (BPF) that transmits only light of a specified wavelength, and the other ray of the separated light is detected by a forward scattered light (FSC) detector.

3. OPERATION FLOW EXAMPLES

Figure 6:
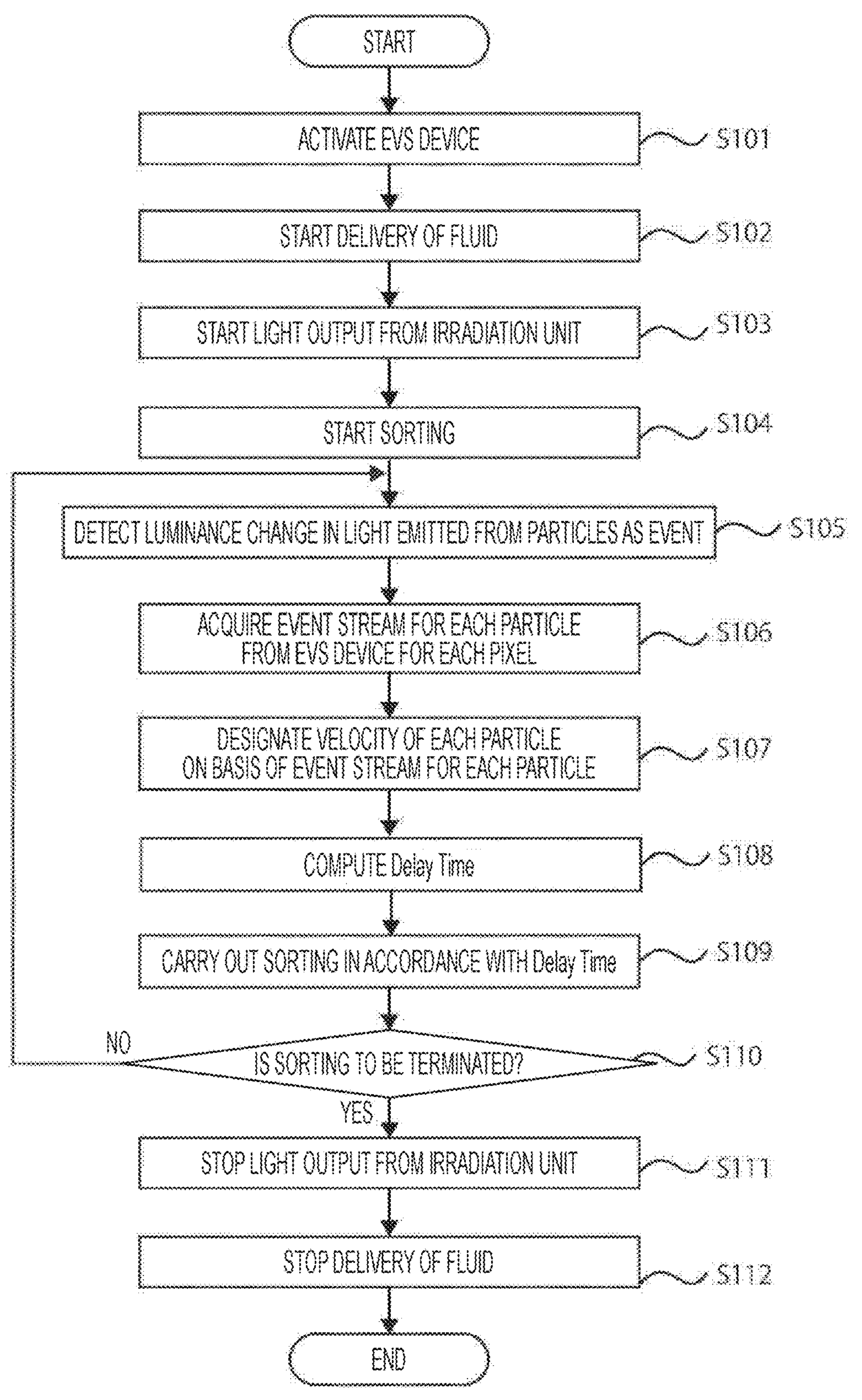
FIG. 6 is a flowchart illustrating an operation example according to the embodiment of the present technology.
Figure 7:
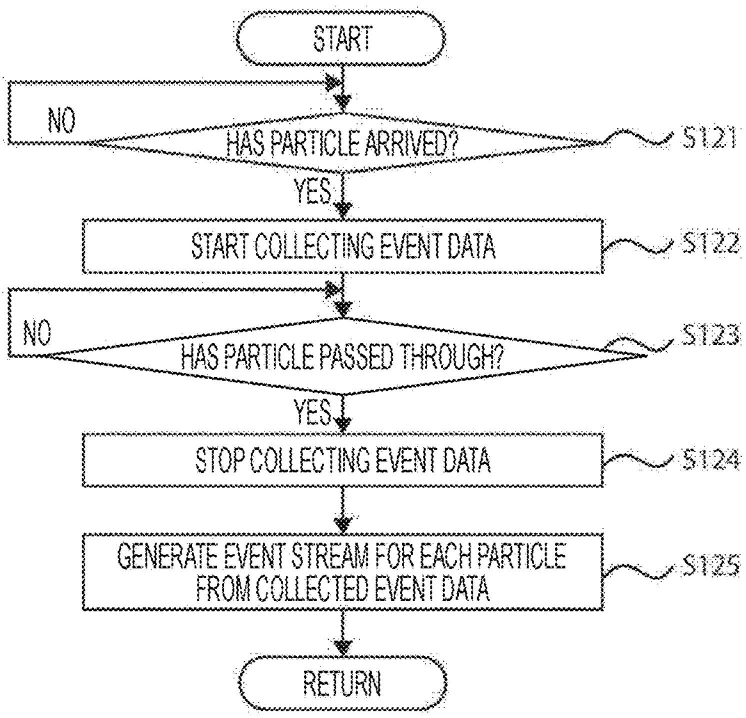
FIG. 7 is a flowchart illustrating a more detailed operation example of an event stream acquisition operation indicated in step S106 in FIG. 6.

Next, operation examples executed by the particle sorting apparatus 100 according to the embodiment illustrated in FIG. 2 will be described. FIGS. 6 and 7 are flowcharts illustrating operation examples according to the present embodiment. Note that the execution of the operations described below may be controlled by a control unit (not illustrated) or the like that controls the particle sorting apparatus 100.

As illustrated in FIG. 6, in this operation, first, the EVS device 122 is activated (step S101), delivery of a fluid containing particles (such as a biological sample as an example) to the flow path P is started (step S102), and light output from the irradiation unit 11 that performs irradiation with light from the plurality of light sources 111 is also started (step S103: irradiation step). In addition, the light detection unit 123 may be activated at this timing. Note that the execution order of steps S101 to S103 may be switched.

Subsequently, when sorting is started (step S104), the EVS device 122 detects a luminance change in light emitted from the particles, as an event (step S105: detection step), and inputs a result of the detection to the processing unit 14.

Here, the plurality of specified spots 110 in the flow path P is irradiated with light from the irradiation unit 11. Accordingly, when the particles contained in the fluid delivered to the flow path P pass through the plurality of spots 110, fluorescence, scattered light, or the like is emitted from each spot 110. These rays of light emitted from each spot 110 is incident on the light-receiving surface of the EVS device 122 via the detection optical system 121. Thus, each event pixel 20 in the EVS device 122 detects a luminance change due to an image of light emitted when each particle passes through each spot 110, as a positive event and a negative event. The event data detected for each event pixel 20 is output to the processing unit 14 from the EVS device 122 at any time, that is, asynchronously.

Note that, since the event data including the polarity and the time stamp of the event that has occurred is output as a stream (event stream) to the processing unit 14 from the EVS device 122 only for the event pixel 20 in which an event has occurred, the data transfer amount can be significantly reduced as compared with the approach of outputting the light reception amounts of all the pixels.

Subsequently, the processing unit 14 acquires the event stream for each particle on the basis of the event data for each event pixel 20 output from the EVS device 122 (step S106). Note that the event stream of each particle may be a set of event streams for each event pixel 20.

Then, the processing unit 14 designates each particle velocity on the basis of the event stream for each particle (step S107). In addition, the processing unit 14 computes the delay time according to each particle velocity and the liquid feeding distance (step S108). In addition, at the same time as the computation of the delay time, the processing unit 14 performs sorting verification on the basis of the information regarding the particle acquired by the light detection unit 123 and generates the sorting control signal including information regarding the presence or absence, magnitude, and the like of charging.

Subsequently, the sorting control unit 13 controls the charging unit 15*a* in the sorting unit 15 in accordance with these delay time and sorting control signal to carry out sorting (step S109: sorting control step).

Thereafter, it is verified whether or not sorting is to be terminated (step S110), and in a case where sorting is not to be terminated (NO in step S110), the process goes back to step S105, and the following operations are executed. On the other hand, in a case where sorting is to be terminated (YES in step S110), the light output from the irradiation unit 11 is stopped (step S111), the delivery of the fluid containing the particles to the flow path P is also stopped (step S112), and this operation is terminated.

Next, the operation of acquiring the event stream described in step S106 in FIG. 6 will be described in more detail with reference to FIG. 7. FIG. 7 is a flowchart illustrating a more detailed operation example of an event stream acquisition operation indicated in step S106 in FIG. 6.

As illustrated in FIG. 7, in the event stream acquisition operation indicated in step S106 in FIG. 6, first, the processing unit 14 monitors a sequence of event data (event stream) input from the EVS device 122, thereby determining whether or not a particle has arrived at the specified spots 110 in the flow path P (step S121). Note that the monitoring of the event stream by the processing unit 14 may be regularly executed after the operation illustrated in FIG. 6 is started.

When the particle arrives at the specified spots in the flow path P (YES in step S121), the processing unit 14 starts collecting event data after the arrival of the particle, including event data indicating the arrival of the particle (step S122). Note that all the event data input from the EVS device 122 may be accumulated in a predetermined storage area separately from the collection of the event data in step S122.

Thereafter, the processing unit 14 monitors a sequence of event data (event stream) input from the EVS device 122, thereby determining whether or not the particle has finished passing through the specified spots 110 in the flow path P (step S123). Then, when the particle has finished passing through the specified spots 110 in the flow path P (YES in step S123), the processing unit 14 stops collecting the event data (step S124) and generates an event stream for each particle having passed through the specified spots 110 in the flow path P, for each event pixel 20, from the collected event data (step S125). Thereafter, the process returns to the operation illustrated in FIG. 6.

Note that the present technology can also adopt the following configurations.

[1]

A particle sorting apparatus including:

an irradiation unit that includes a plurality of light sources and irradiates a particle contained in a fluid with light from the plurality of light sources;

a detection unit that includes a plurality of pixels configured to detect, as an event, a luminance change in the light emitted from the particle due to irradiation of the light from each of the light sources; and a sorting control unit that controls sorting of the particle on the basis of event data detected by the detection unit.

[2]

The particle sorting apparatus according to [1], in which the irradiation unit is configured to perform irradiation at different positions in a flow direction of the fluid with light from the plurality of light sources.

[3]

The particle sorting apparatus according to [1] or [2], in which the detection unit asynchronously detects the luminance change in the light, as the event.

[4]

The particle sorting apparatus according to any one of [1] to [3], in which the event data includes any one or more pieces of data from a group made up of position information on the pixels that detected the event, time information at which the event was detected, and polarity information on the event.

[5]

The particle sorting apparatus according to any one of [1] to [4], in which the event data includes position information on the pixels that detected the event and time information at which the event was detected.

[6]

The particle sorting apparatus according to [5], in which the position information on the pixels that detected the event is gated in advance.

[7]

The particle sorting apparatus according to any one of [1] to [6], further including a processing unit that designates the particle velocity on the basis of the event data.

[8]

The particle sorting apparatus according to [7], further including a sorting unit that sorts a droplet containing the particle, in which the sorting unit includes a charging unit that charges the droplet, and the sorting control unit controls a charging timing by the charging unit on the basis of the particle velocity.

[9]

The particle sorting apparatus according to any one of [1] to [8], in which the light emitted from the particle includes fluorescence or scattered light.

[10]

The particle sorting apparatus according to [9], in which the scattered light includes forward scattered light.

[11]

The particle sorting apparatus according to any one of [1] to [10], in which, in a case where the plurality of light sources is made up of three or more light sources, the event is detected by irradiation with light based on two light sources farthest from each other in a flow direction of the fluid.

[12]

The particle sorting apparatus according to any one of [1] to [11], in which the particle includes a biologically relevant particle.

[13]

A particle sorting method including:

an irradiation step of including a plurality of light sources and irradiating a particle contained in a fluid with light from the plurality of light sources;

a detection step of detecting, as an event, a luminance change in the light emitted from the particle due to irradiation of the light from each of the light sources; and a sorting control step of controlling sorting of the particle on the basis of event data detected in the detection step.

REFERENCE SIGNS LIST

100 Particle sorting apparatus
11 Irradiation unit
110, 110*a* to 110*g* Spot
111 Light source
112 Light-guiding optical system
12 Detection unit
121 Detection optical system
122 EVS device
123 Light detection unit
13 Sorting control unit
14 Processing unit
15 Sorting unit
15*a* Charging unit
15*b* Counter electrode

16 Analysis unit
20 Event pixel
201 Pixel array unit
202 X arbiter
203 Y arbiter
204 Event signal processing circuit
205 System control circuit
206 Output interface (I/F)
P Flow path
P11 Sample liquid flow path
P12*a*, P12*b* Sheath liquid flow path
P13 Main flow path, linear flow path
D Droplet containing particles
BOP Break-off point

The invention claimed is:

1. A particle sorting apparatus comprising:

an irradiation unit that includes a plurality of light sources and irradiates a particle contained in a fluid with light from the plurality of light sources wherein, in a case where the plurality of light sources is made up of three or more light sources, an event is detected by irradiation with light based on two light sources farthest from each other in a flow direction of the fluid, a distance between the two light sources defined as a detection position interval, wherein the detection position interval is 400 μm or more in order to prevent the light sources from interfering with each other;

a controller configured to:

select a first light source and a second light source of the plurality of light sources for irradiating the particle such that the first light source and the second light source have the shortest and second shortest, respectively, excitation wavelengths of the plurality of light sources; and control the irradiation unit to irradiate the particle with light from the first light source and the second light source of the plurality of light sources;

a detection unit that includes a plurality of pixels configured to detect, as an event, a luminance change in the light emitted from the particle due to irradiation of the light from each of the light sources; and a sorting control unit that controls sorting of the particle on a basis of event data detected by the detection unit.

2. The particle sorting apparatus according to claim 1, wherein the irradiation unit is configured to perform irradiation at different positions in a flow direction of the fluid with light from the plurality of light sources.

3. The particle sorting apparatus according to claim 1, wherein the detection unit asynchronously detects the luminance change in the light, as the event.

4. The particle sorting apparatus according to claim 1, wherein the event data includes any one or more pieces of data from a group made up of position information on the pixels that detected the event, time information at which the event was detected, and polarity information on the event.

5. The particle sorting apparatus according to claim 1, wherein the event data includes position information on the pixels that detected the event and time information at which the event was detected.

6. The particle sorting apparatus according to claim 5, wherein the position information on the pixels that detected the event is gated in advance.

7. The particle sorting apparatus according to claim 1, further comprising a processing unit that designates a particle velocity on a basis of the event data.

8. The particle sorting apparatus according to claim 7, further comprising a sorting unit that sorts a droplet containing the particle, wherein the sorting unit includes a charging unit that charges the droplet, and the sorting control unit controls a charging timing by the charging unit on a basis of the particle velocity.

9. The particle sorting apparatus according to claim 1, wherein the light emitted from the particle includes fluorescence or scattered light.

10. The particle sorting apparatus according to claim 9, wherein the scattered light includes forward scattered light.

11. The particle sorting apparatus according to claim 1, wherein the particle includes a biologically relevant particle.

12. A particle sorting method comprising:

an irradiation step of including a plurality of light sources and irradiating a particle contained in a fluid with light from the plurality of light sources wherein, in a case where the plurality of light sources is made up of three or more light sources, an event is detected by irradiation with light based on two light sources farthest from each other in a flow direction of the fluid, a distance between the two light sources defined as a detection position interval, wherein the detection position interval is 400 μm or more in order to prevent the light sources from interfering with each other;

a controlling step comprising:

selecting a first light source and a second light source of the plurality of light sources for irradiating the particle such that the first light source and the second light source have the shortest and second shortest, respectively, excitation wavelengths of the plurality of light sources; and controlling an irradiation unit to irradiate the particle with light from the first light source and the second light source of the plurality of light sources;

a detection step of detecting, as an event, a luminance change in the light emitted from the particle due to irradiation of the light from each of the light sources; and a sorting control step of controlling sorting of the particle on a basis of event data detected in the detection step.

* * * * *